US012223805B2

(12) United States Patent
Serafini

(10) Patent No.: US 12,223,805 B2
(45) Date of Patent: Feb. 11, 2025

(54) GAMING APPARATUS AND METHOD FOR PLAYING A GAME

(71) Applicant: Paolo Serafini, East Fremantle (AU)

(72) Inventor: Paolo Serafini, East Fremantle (AU)

( * ) Notice: Subject to any disclaimer, the term of this patent is extended or adjusted under 35 U.S.C. 154(b) by 62 days.

(21) Appl. No.: 16/648,501

(22) PCT Filed: Sep. 20, 2018

(86) PCT No.: PCT/AU2018/051031
§ 371 (c)(1),
(2) Date: Mar. 18, 2020

(87) PCT Pub. No.: WO2019/056064
PCT Pub. Date: Mar. 28, 2019

(65) Prior Publication Data
US 2024/0282175 A1 Aug. 22, 2024

(30) Foreign Application Priority Data
Sep. 20, 2017 (AU) ................................ 2017903827

(51) Int. Cl.
*G07F 17/32* (2006.01)

(52) U.S. Cl.
CPC ........ *G07F 17/3288* (2013.01); *G07F 17/322* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 5,735,742 A * | 4/1998 | French | G07F 7/0866 | 273/138.2 |
| 5,924,926 A * | 7/1999 | Brown | A63F 3/00157 | 273/308 |
| 8,545,300 B2 * | 10/2013 | Colton | A63F 3/00157 | 453/42 |
| 8,900,047 B1 * | 12/2014 | Ferrell | G07F 17/3286 | 273/274 |
| 9,636,571 B1 * | 5/2017 | Curtis | G07F 17/326 | |
| 9,914,045 B1 * | 3/2018 | Lambert | G07F 17/322 | |
| 2003/0232651 A1 * | 12/2003 | Huard | G07F 17/32 | 463/42 |

(Continued)

*Primary Examiner* — Seng H Lim
(74) *Attorney, Agent, or Firm* — Mohr Intellectual Property Law Solutions, PC

(57) ABSTRACT

Provided is gaming apparatus (10) useable to playing a dice game generally a dealer and at least one player. The apparatus (10) typically comprises a gaming surface (12) which is configured to define a plurality of betting zones, as shown, and a recording device for recording an outcome of the dice rolled for display. In one embodiment, the betting zones comprise at least one higher roll zone (14), at least one double roll zone (18), and at least one equal roll zone (16). Said zones are generally shaped and dimensioned for operatively receiving a betting token from at least one player. Such a betting token is generally indicative of a value of a wager placed on an outcome of dice rolled sequentially by a player and the dealer after the betting tokens have been placed in the desired zones. The outcome of the at least one player and dealer sequentially rolling the dice is then determined according to predefined ratios calculated on a statistical likelihood of occurrence.

19 Claims, 8 Drawing Sheets

(56) References Cited

U.S. PATENT DOCUMENTS

| | | | | | |
|---|---|---|---|---|---|
| 2004/0251626 | A1* | 12/2004 | Porter | A63F 3/00157 | 273/146 |
| 2007/0075490 | A1* | 4/2007 | Gak | A63F 3/00157 | 273/146 |
| 2008/0076529 | A1* | 3/2008 | Richards | G07F 17/32 | 463/25 |
| 2008/0217851 | A1* | 9/2008 | Colton | A63F 3/00157 | 273/274 |
| 2009/0131151 | A1* | 5/2009 | Harris | G07F 17/3232 | 463/22 |
| 2009/0181744 | A1* | 7/2009 | Yoshizawa | G07F 17/3211 | 463/16 |
| 2009/0203437 | A1* | 8/2009 | Yoshizawa | G07F 17/3213 | 463/27 |
| 2010/0252991 | A1* | 10/2010 | McGrath | A63F 3/00157 | 273/146 |
| 2011/0278794 | A1* | 11/2011 | Brodrick | A63F 3/00157 | 273/274 |
| 2011/0309578 | A1* | 12/2011 | Lambert | G07F 17/32 | 273/274 |
| 2012/0104694 | A1* | 5/2012 | Horbury | A63F 9/04 | 273/274 |
| 2012/0252564 | A1* | 10/2012 | Moore | A63F 3/00157 | 463/25 |
| 2014/0265124 | A1* | 9/2014 | Madson | G07F 17/32 | 273/274 |
| 2018/0075698 | A1* | 3/2018 | Shigeta | G06T 7/60 | |
| 2019/0188969 | A1* | 6/2019 | Nelson | G07F 17/3206 | |
| 2020/0402363 | A1* | 12/2020 | Madson | G07F 17/3272 | |

* cited by examiner

GAMING APPARATUS AND METHOD FOR PLAYING A GAME

CROSS REFERENCE TO RELATED APPLICATIONS

This application claims priority to Patent Cooperation Treaty Application, No. PCT/AU2018/05103, filed on Sep. 20, 2018, which claims priority to Australian Patent Application No. 2017903827, filed on Sep. 20, 2017, the applications of which are hereby incorporated by reference for all purposes.

TECHNICAL FIELD

This invention relates to the field of gaming, in general, and more specifically to gaming apparatus and an associated method for playing a game.

BACKGROUND ART

The following discussion of the background art is intended to facilitate an understanding of the present invention only. The discussion is not an acknowledgement or admission that any of the material referred to is or was part of the common general knowledge as at the priority date of the application.

As is well-known in the art, dice (singular 'die') are small throwable objects with multiple resting positions, used for generating random numbers. Dice are suitable as gambling devices and are also typically used in non-gambling tabletop games. Dice have been used since before recorded history, with the oldest known dice excavated as part of a backgammon-like game set at an archaeological site in south-eastern Iran, estimated to be from between 2800-2500 BCE.

In light of humanity's long-standing use of dice, a large number of games have been developed through the ages that make use of dice. Dice are typically thrown onto a flat surface either from the hand or from a container designed for this, such as a dice cup. The face of the die that is uppermost when it comes to rest provides the value of the throw.

The result of a die roll is determined by the way it is thrown, according to the laws of classical mechanics. A die roll is made random by uncertainty in minor factors such as tiny movements in the thrower's hand. They are thus a crude form of hardware random number generator. To mitigate concerns that dice pips on the faces of certain styles of dice cause a small bias, casinos use precision dice with flush markings.

Applicant has identified a need in the art for an entertaining game, also suitable for a gambling environment. Accordingly, the present invention seeks to propose possible improvements, at least in part, to the art of dice-based gaming.

SUMMARY OF THE INVENTION

According to a first aspect of the invention there is provided gaming apparatus for operatively playing a dice game by a dealer and at least one player, said apparatus comprising a gaming surface configured to define a plurality of betting zones, and a recording device for recording an outcome of the dice rolled for display;

wherein the plurality of betting zones are shaped and dimensions for operatively receiving a betting token from at least one player, said token indicative of a value of a wager placed on an outcome of dice rolled sequentially by a player and the dealer, wherein a wager outcome is determined according to a ratio calculated on a statistical likelihood of occurrence, wherein the statistical likelihood of occurrence is determined based upon a plurality of outcomes of dice rolled provided by the recording device.

Typically, the recording device is a manual input device for use by the dealer.

Typically, the recording device is a pattern recognition sensor, adapted to capture an image of the surface of the dice rolled and determine the outcome of the dice roll through pattern recognition of dice pips.

Typically, the recording device may be used to generate a fault entry, which halts the progress of the dice game and any monetary transactions.

Typically, the gaming g surface is configured to include a particular double roll betting zone for receiving betting tokens wagering that the outcome is a particular double roll.

Typically, the gaming surface is configured to include a progressive jackpot betting zone for receiving betting tokens wagering that the outcome is an aggregate of particular double rolls.

Typically, the gaming surface is configured to include a multiple-double betting zone for receiving betting tokens wagering that multiple sequential outcomes are particular double rolls.

Typically, the gaming apparatus includes indicium for indicating a plurality of predefined ratios.

Typically, the gaming apparatus includes indicium for indicating a plurality of statistical likelihood of occurrence for dice rolls.

Typically, the gaming apparatus includes a visual display is used for showing the indicium.

Typically, the visual display is an integral screen mounted to the gaming surface.

Typically, the visual display is also the recording device.

Typically, the plurality of outcomes of the dice rolled recorded by the recording device is stored in a database housed in a processing system.

Typically, the processing system is adapted to calculate the wager payout for each player based upon the outcome of the dice rolled and the predefined ratios.

Typically, the gaming apparatus includes an electronic indicator configured to allow the dealer to indicate when a betting token is placed in a particular zone.

Typically, the electronic indicator includes a light embedded in the particular zone.

According to a second aspect of the invention there is provided a method for playing a game, said method comprising the steps of:

- providing a gaming surface defining a plurality of betting zones shaped and dimensioned for operatively receiving a betting token from at least one player, said token indicative of a value of a wager placed on an outcome of dice rolled sequentially by a player and the dealer, wherein said outcome is determined according to predefined ratios calculated on a statistical likelihood of occurrence, said zones including (i) at least one higher roll zone, (ii) at least one equal roll zone, and (iii) at least one double roll zone;
- receiving at least one betting token in at least one zone;
- in response to a player rolling the dice, recording the player roll; and
- in response to the dealer rolling the dice, recording the dealer roll, and comparing the player roll to the dealer roll to determine the outcome to honour the wager.

Typically, the step of receiving the betting token includes receiving a token in a particular double roll betting zone wagering that the outcome is a particular double roll.

Typically, the step of receiving the betting token includes receiving a token in a progressive jackpot betting zone wagering that the outcome is an aggregate of particular double rolls.

Typically, the step of receiving the betting token includes receiving a token in a multiple-double betting zone wagering that multiple sequential outcomes are particular double rolls.

According to a third aspect of the invention there is provided a computer programme product which, when executed by a suitable processing system, facilitates the performance of the above method for playing a game.

In one example, the suitable processing system comprises a mobile phone or similar handheld device.

BRIEF DESCRIPTION OF THE DRAWINGS

The description will be made with reference to the accompanying drawings in which.

DETAILED DESCRIPTION OF EMBODIMENTS

Figure 1A:
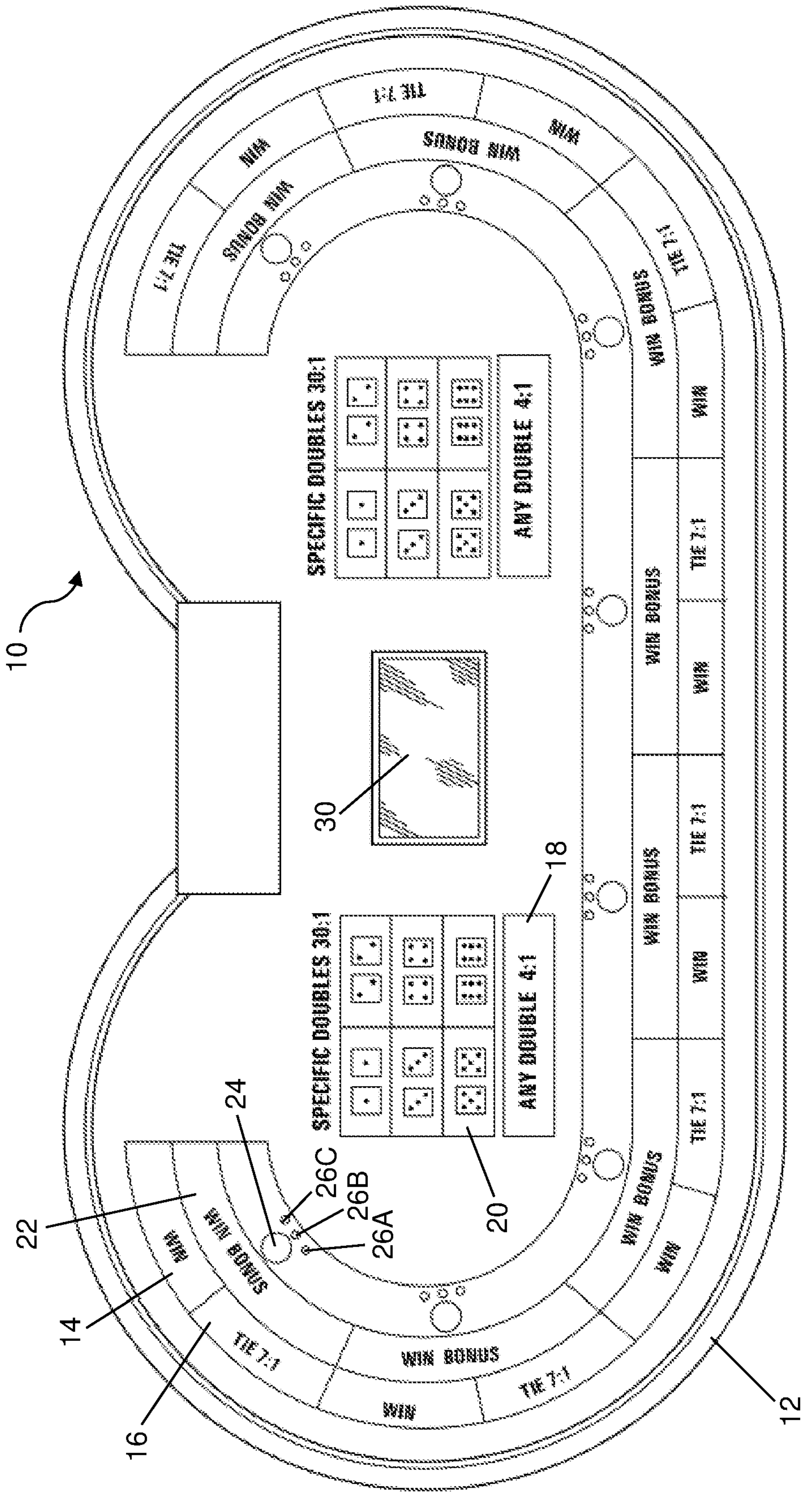
FIGS. 1A to 1C are top-view diagrammatic representations of several embodiments of a gaming apparatus, in accordance with an aspect of the invention.
Figure 1B:
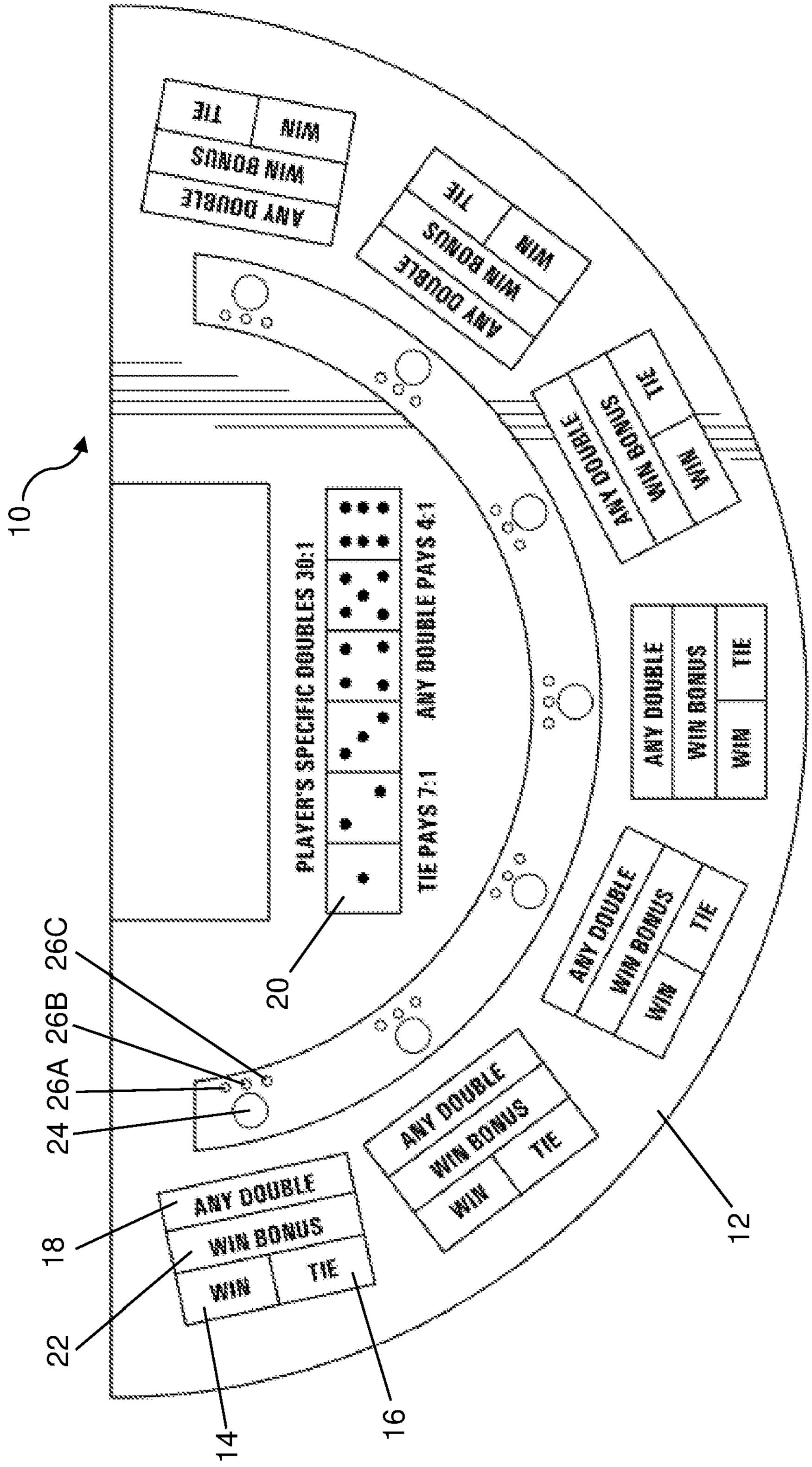
Figure 1C:
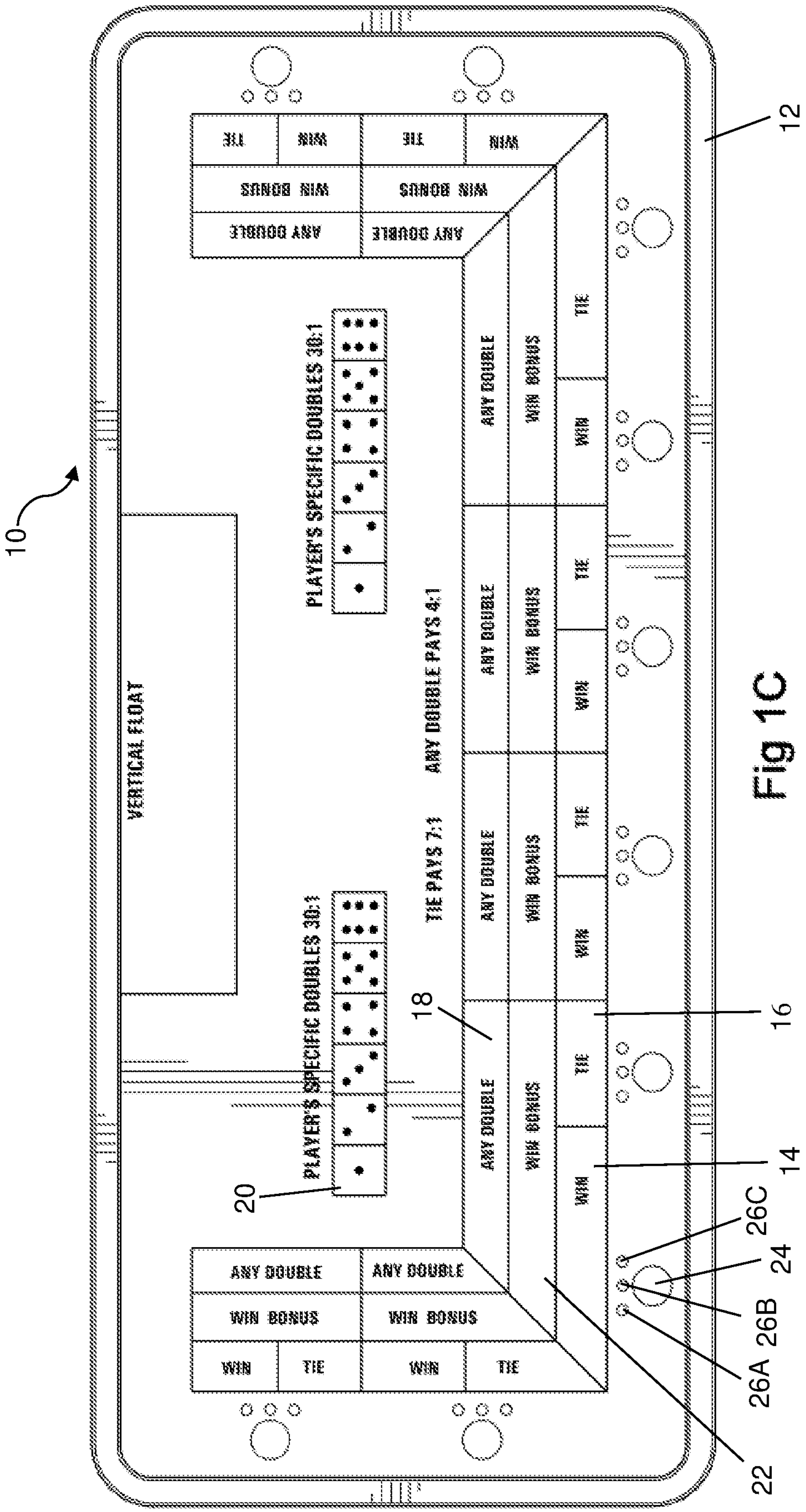

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

Referring now to FIGS. 1A to 1C and 2A to 20 of the accompanying drawings, there is shown several possible embodiments of a gaming apparatus 10 useable for playing a dice game by a plurality of participants. The participants typically comprise a dealer and at least one player. The apparatus 10 typically comprises a gaming surface 12 which is configured to define a plurality of betting zones, as shown. The apparatus 10 further comprises a recording device for recording an outcome of the dice rolled for display. A plurality of dice are used by the dealer and the at least one player. The dice are rolled either upon the gaming surface 12 in a specified zone or are rolled using a dice shaker.

In one embodiment, the betting zones comprise at least one higher roll zone 14, at least one equal roll zone 16, and at least one double roll zone 18. The betting zones are indicative of an outcome of dice rolled by a player. The at least one higher roll zone 14 indicates that the player wagers the outcome of their dice roll to be higher than that of the dealer, wherein the at least one equal roll zone 16 indicates that the player wagers the outcome of their dice roll to be equal to that of the dealer. The at least one double roll zone 18 indicates that the player wagers the outcome of their dice roll to contain at least one pair of dice. The skilled addressee will appreciate that the zones are indicated in certain areas of the exemplified gaming surface 12, but a position and number of such zones may vary in other embodiments. Additionally, the skilled addressee will appreciate that the dice roll will be comprised of at least but is not limited to a pair of dice.

All zones are generally shaped and dimensioned for operatively receiving at least one betting token from at least one player. Such a betting token is generally indicative of a value of a wager placed on the outcome of the dice rolled sequentially by a player and the dealer after the betting tokens have been placed in the desired zones. A wager payout of the outcome of the dice rolled for the at least one player and dealer is determined according to a plurality of predefined ratios. The predefined ratios are calculated based upon statistical likelihood of occurrence for each particular dice roll.

The recording device is used to the record the outcome of dice rolled. The record of the outcome of dice rolled are stored in a database housed in a processing system. The processing system is adapted to generate a historic log of at least one previous result for display to the dealer and the at least one player. In a preferred embodiment, the processing system is further adapted to calculate the wager payout for each player based upon the outcome of the dice rolled and the plurality of predefined ratios. The wager payout is subsequently display to the dealer. The skilled addressee would appreciate that the historic log and wager payout can be displayed either by a digital representation using a visual display or a physical print out from a printer.

Figure 2A:
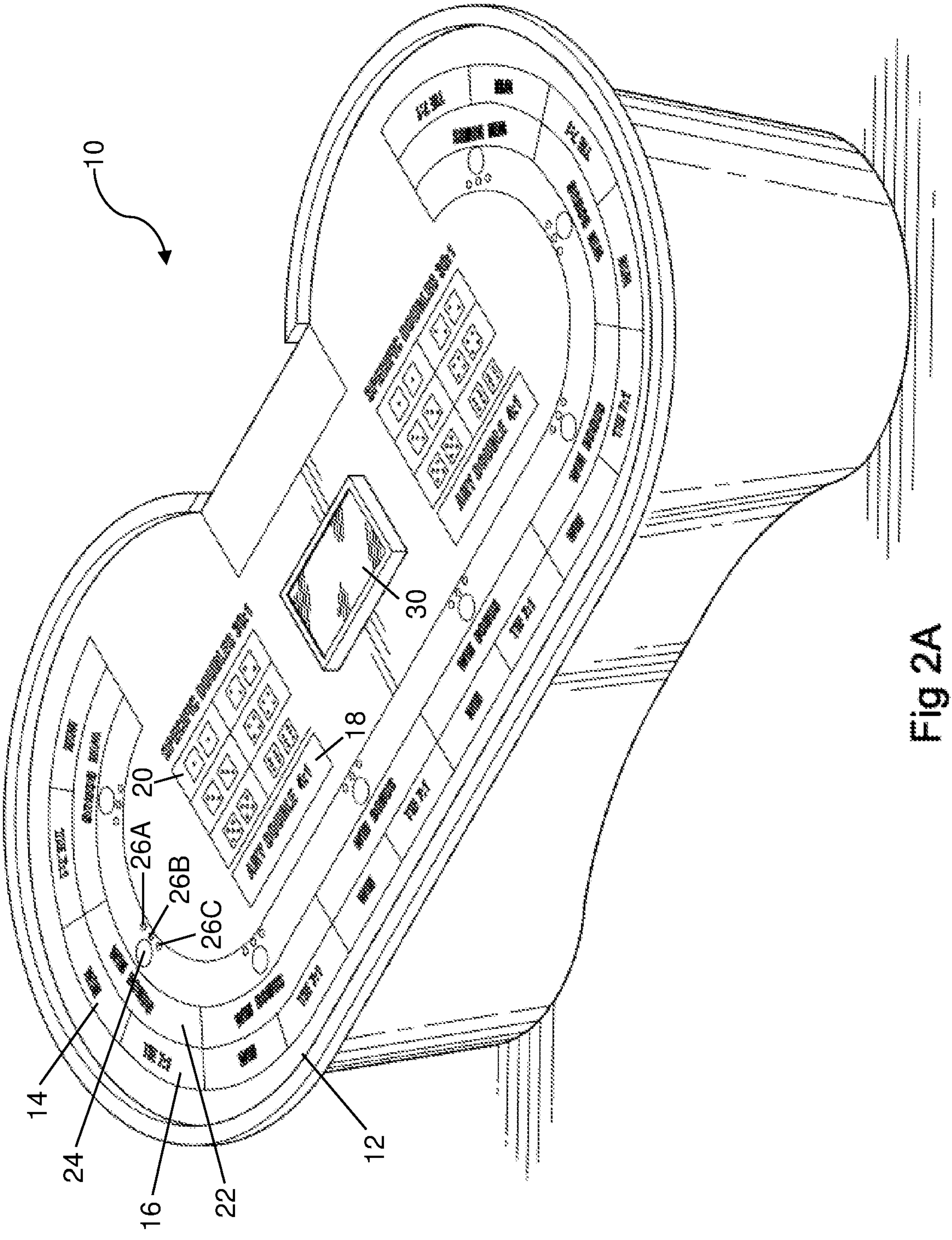
FIGS. 2A to 2C are perspective-view diagrammatic representations of the gaming apparatus of FIGS. 1A to 1C.

FIG. 2A shows an example of the recording device 30 to be utilised by the dealer for recording the outcome of dice rolls. The recording device 30 is typically in the form of a manual input device, such as a touch enabled monitor 30 integral to the gaming surface 12. It would be appreciated by the skilled addressee that the recording device may be of another type of manual input device, such as a handheld computing device or a console attached to the gaming surface. The recording devices 30 enables the dealer to record the outcome of the dice rolls and store it in the database housed in the processing system.

The skilled addressee would appreciate that the recording device may also comprise a pattern recognition sensor. The pattern recognition sensor being adapted to capture an image of the surface of the dice rolled, determine the outcome of the dice roll through pattern recognition of dice pips, and record the outcome of dice rolls into the database.

Figure 2B:
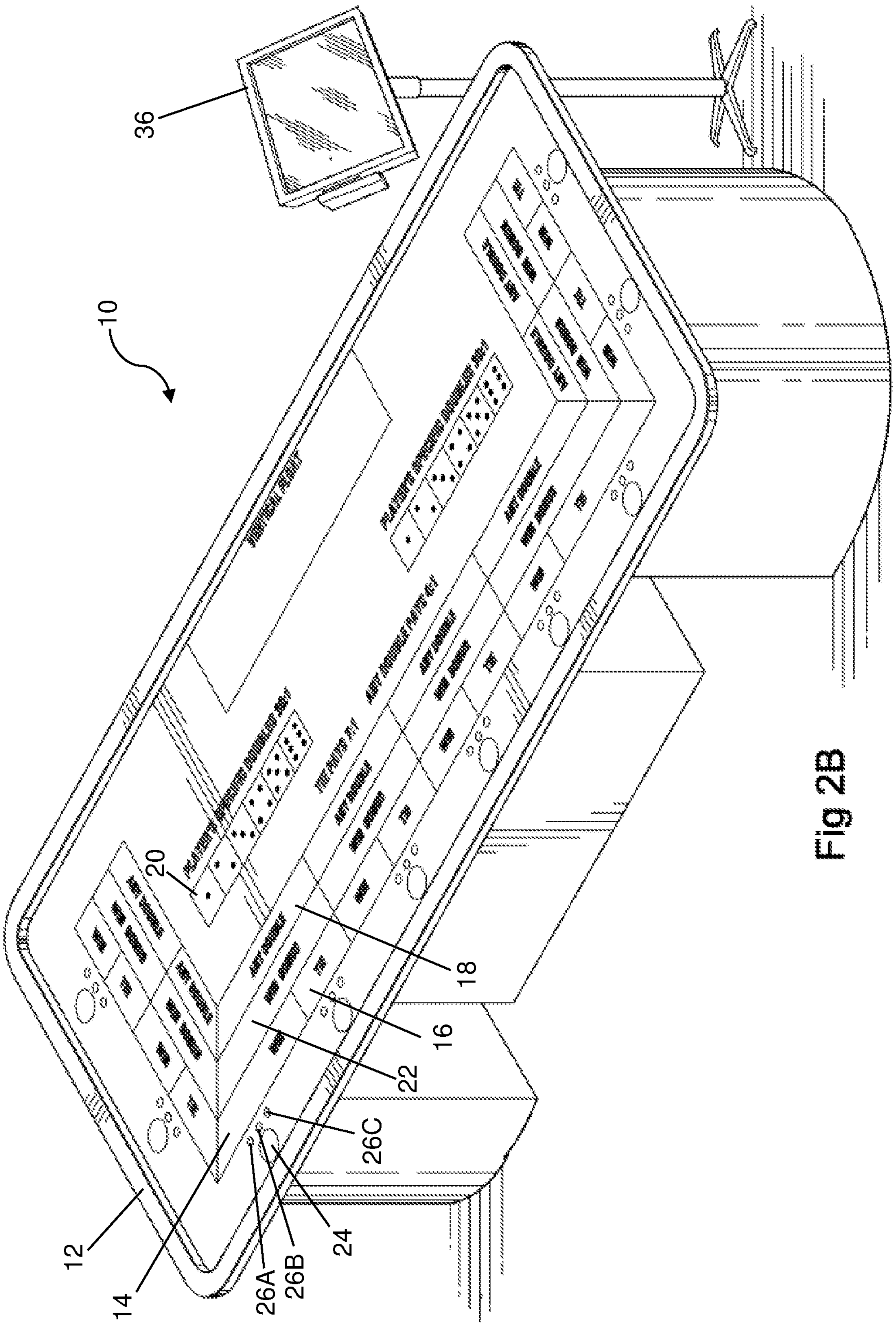
Figure 2C:
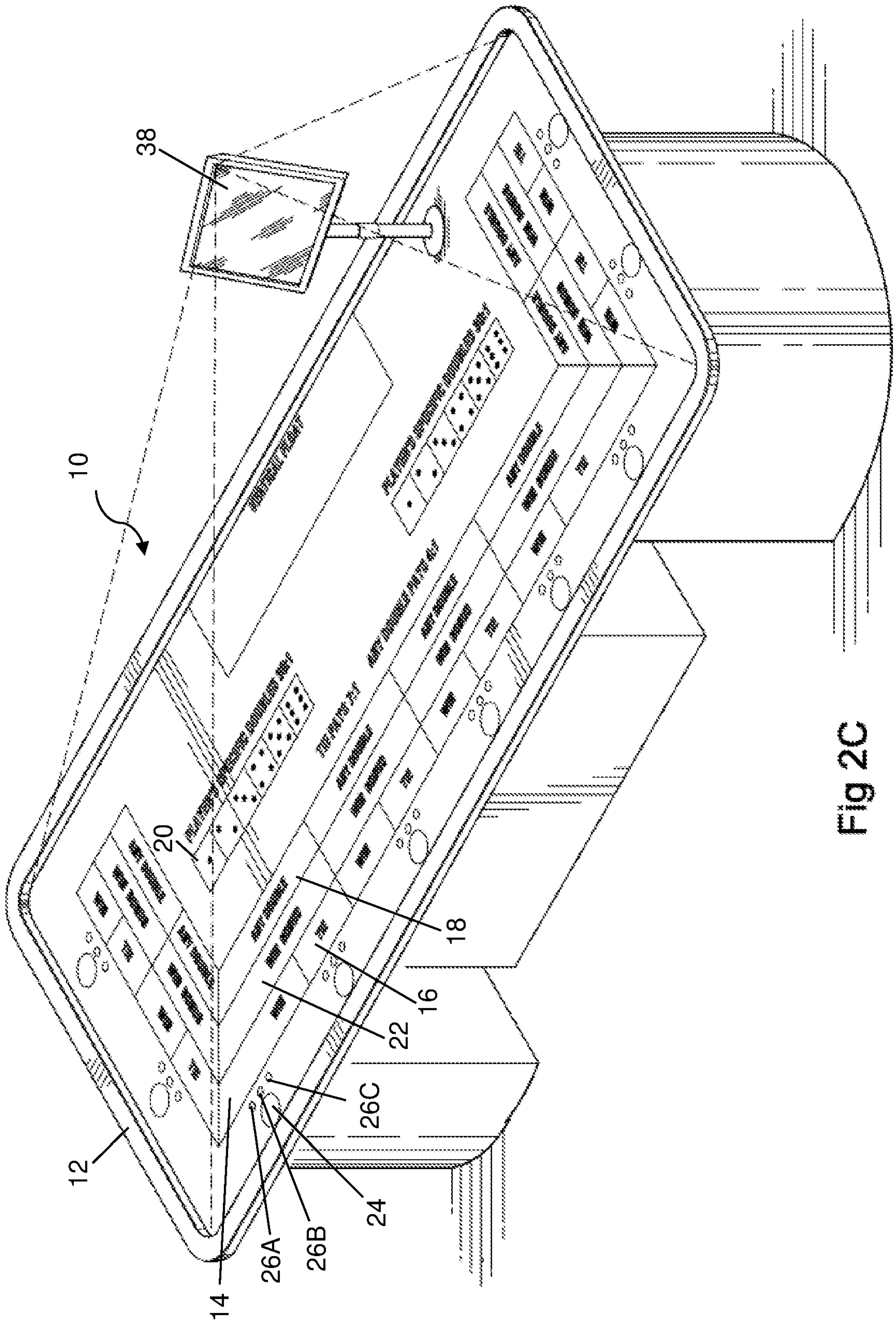

The visual display provides an efficient avenue for participants to know of the likelihood and financial outcomes of their particular dice rolls. This information may be used by the at least one player to make a decision on what to wager and provides an insight to the dealer on potential player decisions. FIGS. 1A and 2A shows a first visual display in the form of the recording device 30, which is a touch screen built into the gaming surface 12. FIG. 2B shows a second visual display in the form of an external standing screen 36 that is positioned next to the gaming surface 12. FIG. 2C shows a third visual display in the form of an integral screen 38 mounted to the gaming surface 12.

In another embodiment of the invention, the recording device may be used to generate a fault entry, which halts the progress of the dice game and any monetary transactions. Upon a fault occurring during the dice game, the dealer may use the recording device to generate the fault entry, which allows the dealer to produce a status report for storing in a fault log. The status report containing the exact conditions of the game apparatus 10 and its associated software for future diagnosis. In a further embodiment, the generation of the fault entry alerts a casino inspector, prompting the casino inspector to visit the gaming apparatus 10 to determine the cause of the fault and record additional notes relating to the fault entry using the recording device or a portable computing device.

FIGS. 1A to 1C and 2A to 2C illustrate the gaming surface 12 is also configured to include additional betting zones. These additional betting zones comprise a particular double roll betting zone 20 typically for receiving betting tokens wagering that the outcome is a particular double roll, and a multiple-double betting zone 24. As mentioned above, the skilled addressee will appreciate that a size, position and configuration of the betting zones may vary between different embodiments, as required.

The multiple-double betting zone 24 is adapted for receiving betting tokens wagering that multiple sequential outcomes are particular double rolls. In a typical embodiment, the multiple double betting zone 24 is a triple-double betting zone. In an example, a player rolls doubles sixes three times in a row. The betting tokens typically comprises of casino chips, but any suitable token can be used, including coins, cards, notes, etc.

In a preferred embodiment, the multiple-double betting zone 24 is further configured to include a plurality of visual indicators for informing the player of their current total of sequential outcomes. According to an embodiment, the multiple double betting zone 24 comprises of the triple-double betting zone having the plurality of visual indicators in the form of three lights 26A, 26B 26C. The lights 26A, 26B, 26C will be lit up sequentially upon the player's sequential rolling of particular double rolls in response to the outcome of the dice rolled recorded by the recording device. In an example, the player rolls an initial double six, which causes the light 26A to be lit. The player subsequently rolls a second double six, causing the light 26B to be lit alongside 26A. Finally, the player rolls a third double six, causing the light 26C to be lit alongside 26A and 26B. This arrangement of lights is advantageous as it visually indicates to the participants of the player's game status, ensures that the game is more time efficient allowing faster throughput of wagers, and increases the excitement level of participants and observers.

In another embodiment, the multiple-double betting zone 24 is configured to detect the presence of the betting tokens placed upon it. The multiple-double betting zone 24 is further configured with a light that illuminates upon detecting the presence of the betting tokens and stay illuminated upon the dealer commencing the dice game. Upon commencement of the dice game, other multiple-double betting zones 24 will not illuminate upon detection of the betting tokens until the dice game has been completed. Additionally, the multiple-double betting zone 24 is configured to de-illuminate upon a non-double result being registered by the dealer during the dice game.

In a typical embodiment, the predefined ratios for the higher roll zone 14 may comprise the wager payout of 1:1. Due to having a lower statistical likelihood of occurrence, the predefined ratios for the double roll zone 18 may comprise the wager payout range of 2:1 to 10:1. Similarly, the predefined ratios for the particular double roll betting zone 20 comprise the wager payout range of 5:1 to 35:1. Additionally, further unique wager payouts may be implemented based upon specific outcomes of dice rolled. In an example, if the outcome of the dice rolled is higher than the dealer and of a specific sum, the wager payout is 0.5:1. When the unique wager payout is triggered, a unique win zone 22 is used to indicate this specific outcome of dice rolled.

Due to having a very low statistical likelihood of occurrence, the wager payout for the multiple-double betting zone 24 generally comprises a progressive wager payout and/or a fixed wager payout of a predetermined amount. As is known in the art, the wager is typically between a betting player and a casino represented by the dealer.

In one example, the gaming apparatus 10 includes an electronic indicator configured to allow the dealer to indicate when a betting token is placed in a particular zone. In another example, the electronic indicator is configured with a sensor to automatically indicate when a betting token is placed in a particular zone. In a further example, the electronic indicator includes a light embedded in the particular zone, but variations hereof are possible and within the scope of the present invention.

In a further example, the gaming apparatus 10 includes a sensor for determining the betting tokens placed in the particular zones. The sensor will then provide the information to the processing system for determination of the total betting values of each participant. These total betting values will then be applied to the predetermine or calculated ratios of financial outcomes based upon the participants' dice rolls. In one example, the sensor is a RFID reader integral to the gaming surface 12. The sensor is configured to read the RFID tags embedded in the tokens to determine the monetary values. Additionally, the sensor is configured to determine the placement of tokens in particular zones based upon signal strength. In another example, the sensor is an optical character recognition sensor that is configured to read the text located on the top of tokens and the titles of the particular zones. This information is then processed to determine total betting values and their placement in the particular zones.

In a further example, a container for storing the betting tokens collected by the dealer is configured with a sensor for determining a total value of the betting tokens. The sensor will then provide information to the processing system for game analysis and monitoring by casino management. In an example, the sensor is a RFID reader integral to the container. The sensor is configured to read the RFID tags embedded in the betting tokens to determine the total monetary value contained in the container. This is advantageous as it allows the casino to monitor the contents of the container without having to disrupt a game session.

The skilled addressee will further appreciate that variations of the gaming surface 12 are possible. For example, the gaming surface 12 could form part of a casino table configured to accommodate two or more dealers in a side-by-side, diagonally opposed manner, or in an opposite manner, where the table allows player access to the gaming surface around its periphery. Further additions may include speakers for playing sounds, lights, etc. For example, speakers made to look like dice held up with poles coming up from the table above the dealer's heads could be included, or a winning zone could light up when an appropriate dice roll or throw is performed, etc. In another example, a light post is located at each player's position at the table and is lit upon activation by the dealer. Further variations are possible and within the scope of the present invention.

The present invention further includes an associated method for playing a game, said method typically comprising the steps of providing the gaming surface 12, in response to a player rolling the dice, recording the player roll, and in response to the dealer rolling the dice, comparing the player roll to the dealer roll to determine the outcome to honour the wager.

The present invention further includes any suitable computer programme product which, when executed by a suitable processing system 100, facilitates the performance of the above method for playing a game. The suitable processing system 100 typically comprises a mobile phone or similar handheld device, as is well known in the art.

Figure 3:
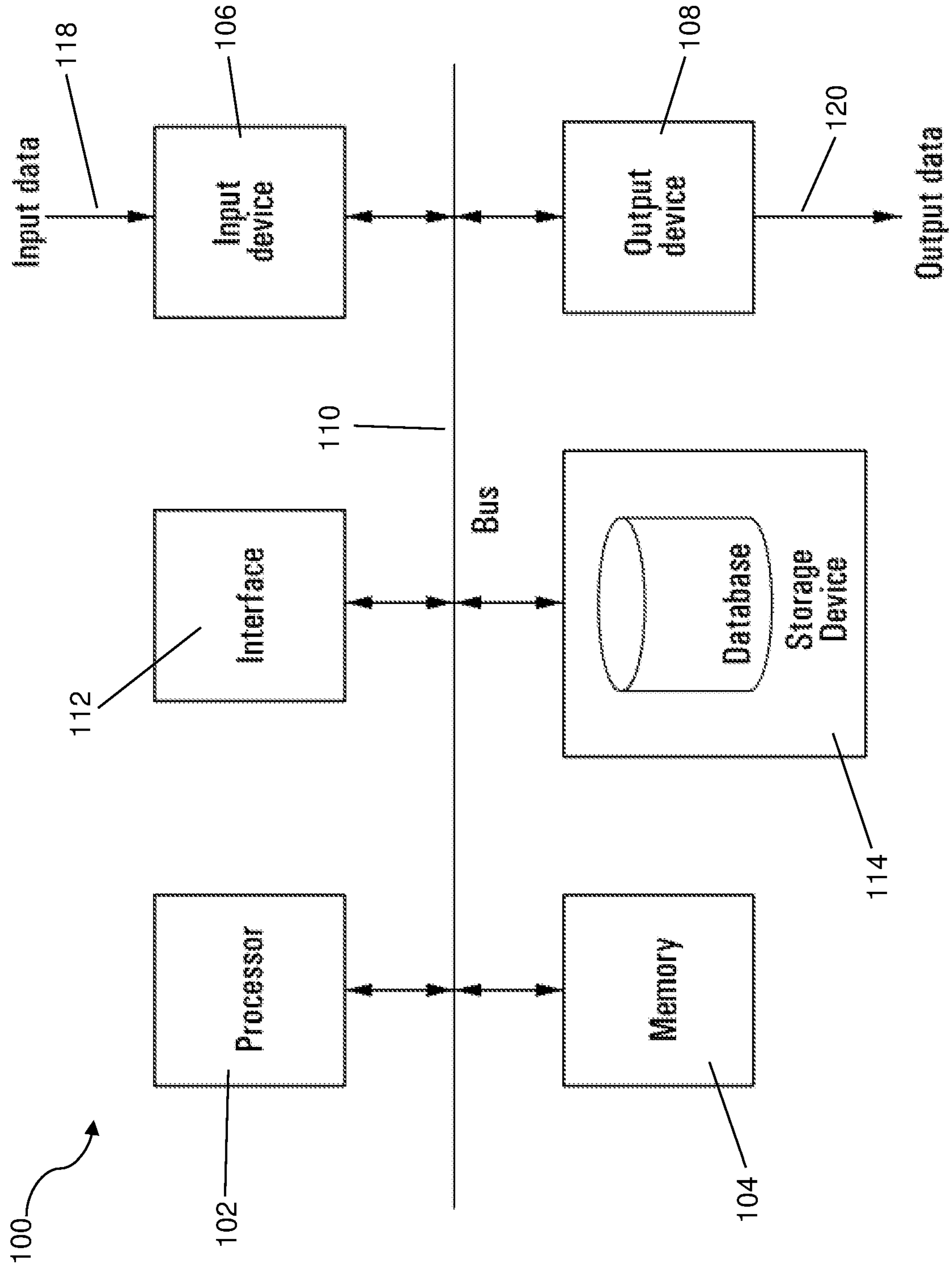
FIG. 3 illustrates a functional block diagram of an example processing system that can be utilised to embody or give effect to a particular embodiment of the method for playing a game, in accordance with an aspect of the invention.

With reference now to FIG. 3 of the accompanying figures, there is shown one particular embodiment of a suitable processing system 100. In particular, the processing system 100 generally includes least one processor 102, or processing unit or plurality of processors, memory 104, at least one input device 106 and at least one output device 108, coupled together via a bus or group of buses 110.

In certain embodiments, input device 106 and output device 108 could be the same device, e.g. a touchscreen. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice-controlled activation such as a microphone, data receiver or antenna such as a modem or wireless data adaptor, data acquisition card, a touchscreen for receiving tactile input, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network.

Figure 4:
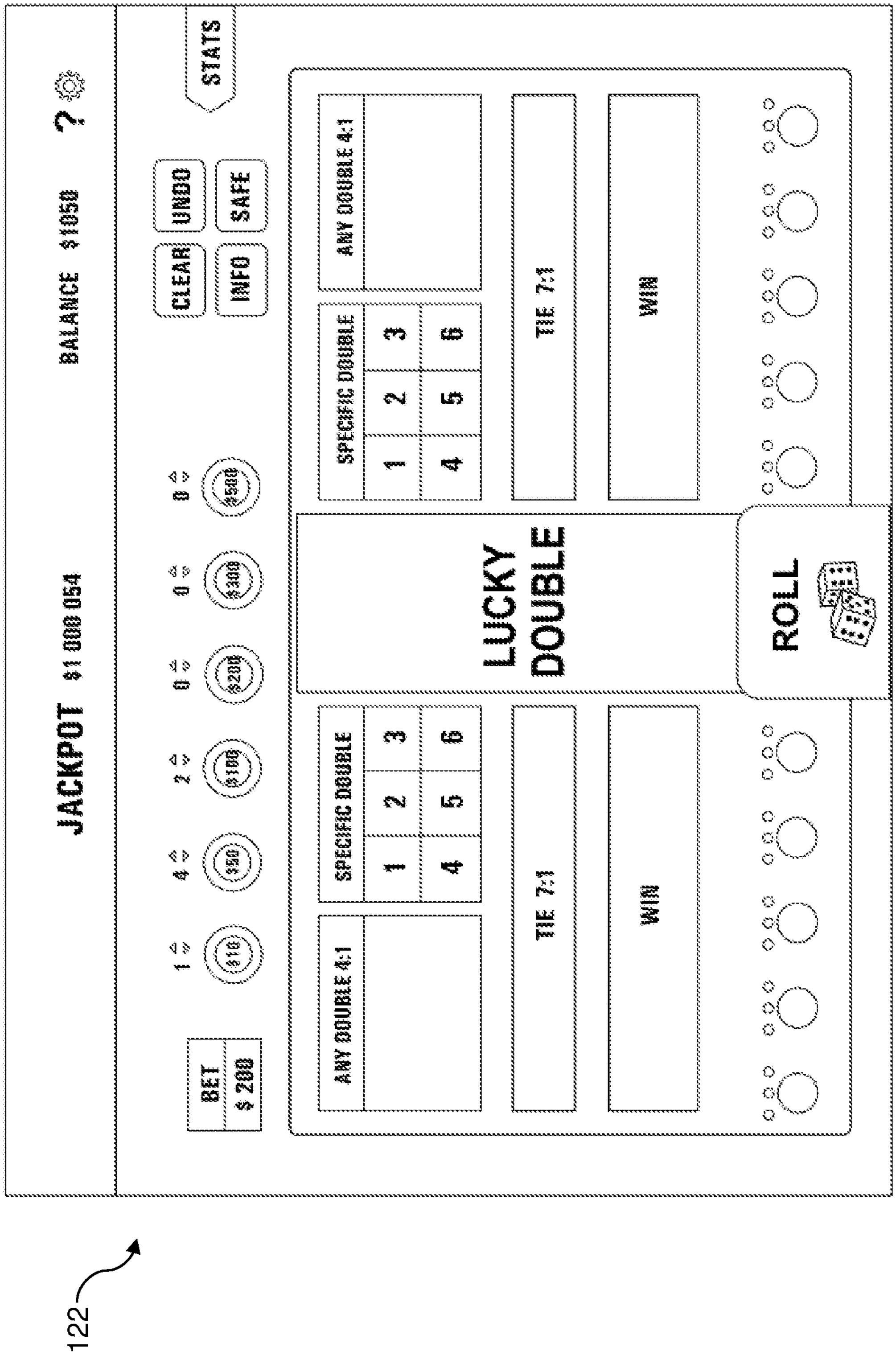
FIG. 4 illustrates an example graphic user interface to be displayed on a device, in accordance with an aspect of the invention.

FIG. 4 shows a view of data output, or an interpretation of the data output 122, on a screen of a mobile computing device. The skilled addressee would also appreciate that the data output 122 may be viewed using other screens or a physical copy could be provided using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

In such a general processing system 100, the computer programme product in accordance with an aspect of the invention generally comprises a set of instructions for operative execution by the processor 102. Such a set of instructions may be stored in memory 104 and/or storage device 114, as is known in the art.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of f one or more embodiments described herein might become apparent to those of ordinary skill in the art upon reading this application. The inventor (s) expects skilled artisans to employ such variations as appropriate, and the inventor (s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A gaming apparatus for operatively playing a dice game by a dealer and at least one player, said apparatus comprising:

a gaming surface configured to define a plurality of betting zones, a processing system, a recording device for recording an outcome of the dice rolled, a sensor for automatically determining betting tokens placed in particular betting zones, and a visual display;

wherein the plurality of betting zones are shaped and dimensioned for operatively receiving the betting token from at least one player, said token indicative of a value of a wager placed on an outcome of dice rolled sequentially by a player and the dealer, receipt of such betting tokens into the betting zones facilitating determination, via the processing system and the sensor, of total betting values of the at least one participant;

wherein the processing system is adapted to calculate the wager payout portion for each player according to such total betting values, the recorded outcome of the dice rolled, and a plurality of predefined ratios based upon sequential dice rolls of each participant calculated on a statistical likelihood of occurrence, said calculated wager payout portion displayed by the visual display to provide an efficient avenue for each game participant to know of the likelihood and associated financial outcomes of sequential dice rolls.

2. The gaming apparatus of claim 1, wherein the recording device is a manual input device for use by the dealer.

3. The gaming apparatus of claim 2, wherein the recording device may be used to generate a fault entry, which halts the progress of the dice game and any monetary transactions.

4. The gaming apparatus of claim 3, wherein the gaming surface is configured to include a particular double roll betting zone for receiving betting tokens wagering that the outcome is a particular double roll.

5. The gaming apparatus of claim 4, wherein the gaming surface is configured to include a multiple-double betting zone for receiving betting tokens wagering that multiple sequential outcomes are particular double rolls.

6. The gaming apparatus of claim 5, further comprising indicium for indicating a plurality of predefined ratios.

7. The gaming apparatus of claim 6, further comprising indicium for indicating a plurality of statistical likelihood of occurrence for dice rolls.

8. The gaming apparatus of claim 7, wherein the visual display displays the indicium.

9. The gaming apparatus of claim 1, wherein the recording device is a pattern recognition sensor, adapted to capture an image of the surface of the dice rolled and determine the outcome of the dice roll through pattern recognition of dice pips.

10. The gaming apparatus of claim 1, wherein the visual display is an integral screen mounted to the gaming surface.

11. The gaming apparatus of claim 1, wherein the visual display is also the recording device.

12. The gaming apparatus of claim 1, wherein the plurality of outcomes of the dice rolled recorded by the recording device is stored in a database housed in the processing system.

13. The gaming apparatus of claim 12, further comprising an electronic indicator configured to allow the dealer to indicate when a betting token is placed in a particular zone.

14. The gaming apparatus of claim 13, wherein the electronic indicator includes a light embedded in the particular zone.

15. A method for playing a dice game by a dealer and at least one player, said method comprising the steps of:

providing a gaming surface defining a plurality of betting zones shaped and dimensioned for operatively receiving a betting token from at least one player, said token indicative of a value of a wager placed on an outcome of dice rolled sequentially by a player and the dealer, said zones including (i) at least one higher roll zone, (ii) at least one equal roll zone, and (iii) at least one double roll zone;

determining, via a processing system and a sensor, total betting values as at least one betting token is placed by the at least one participant in at least one zone;

in response to a player rolling the dice, recording, via a pattern recognition sensor and the processing system, the player roll;

in response to the dealer rolling the dice, recording, via the pattern recognition sensor and the processing system, the dealer roll;

calculating, via the processing system, the wager payout portion for each player according to such total betting values and a plurality of predefined ratios based upon sequential dice rolls of each participant calculated on a statistical likelihood of occurrence; and displaying on a visual display said wager payout portions to provide an efficient avenue for each game participant to know of the likelihood and associated financial outcomes of sequential dice rolls.

16. The method of claim 15, further comprising the step of allowing further sequential rolls by the player and/or dealer to conclusion before an outcome is determined to honour the wager.

17. The method of claim 16, wherein the step of receiving the betting token includes receiving a token in a particular double roll betting zone wagering that the outcome is a particular double roll.

18. The method of claim 17, wherein the step of receiving the betting token includes receiving a token in a progressive jackpot betting zone wagering that the outcome is an aggregate of particular double rolls.

19. The method of claim 18, wherein the step of receiving the betting token includes receiving a token in a multiple-double betting zone wagering that multiple sequential outcomes are particular double rolls.

* * * * *